Nov. 10, 1959  G. B. LOPER  2,912,672
INTENSITY-MODULATED TRANSIENT DISPLAY
Filed July 5, 1955  3 Sheets-Sheet 1

Nov. 10, 1959          G. B. LOPER          2,912,672
INTENSITY-MODULATED TRANSIENT DISPLAY

Filed July 5, 1955          3 Sheets-Sheet 3

United States Patent Office 2,912,672
Patented Nov. 10, 1959

2,912,672

INTENSITY-MODULATED TRANSIENT DISPLAY

George B. Loper, Dallas, Tex., assignor, by mesne assignments, to Socony Mobil Oil Company, Inc., New York, N.Y., a corporation of New York Application July 5, 1955, Serial No. 519,800

9 Claims. (Cl. 340—15)

This invention relates to methods of and apparatus for facilitating the study of transient waves recorded in phonographically reproducible form, and more particularly to the production of a visual display of transient electrical signals by intensity modulation of the high-frequency raster of a cathode ray tube.

While the present invention is applicable broadly to a study of transients, as in acoustical investigations, it is particularly applicable as a tool in the analysis of seismic surveys in which the traces on the seismogram provide valuable information as to the depth and character of subsurface formations. Seismograms are generally reproduced photographically on a film or magnetically on magnetic tape. The present invention is particularly concerned with seismograms in phonographically-reproducible form. By "phonographically-reproducible," I mean seismograms which may be utilized to produce electrical pulses representative of the instantaneous magnitudes of each trace on the seismogram by means of which the seismic records can be analyzed as to their component parts and again recorded in terms of the whole or separate parts thereof. Thus, under this definition it will be seen that wax recordings, magnetic records on steel or iron wire or on magnetic tape and the like are considered full equivalents one to the other and that they include variable area or variable density film.

The present invention is particularly applicable to systems of the type disclosed in copending application Serial No. 388,582 entitled, "Seismic Record Display and Re-Recording System," filed by the applicant as joint inventor with Robert R. Pittman. In that application electronic switches were utilized, and the high-frequency signals therefrom were applied to the vertical deflection circuits in reproducing on the screen of the cathode ray tube traces of the seismogram.

In contrast with the system disclosed in the above-identified application Serial No. 388,582 where an electronic switch is used, the present invention employs intensity modulation of a cathode ray beam together with a uniform raster produced on a fluorescent screen. More particularly, high-frequency signals which result from sampling various seismic traces at high speed are applied by way of a novel circuit to the intensity control elements of a cathode ray tube to produce Z-axis modulation, under which conditions the voltage excursion and the power required are much less than required through the electronic switch deflection procedures of the above-identified application. While electrostatic deflection of the electron beam to produce a raster is satisfactory, large screen cathode ray tubes of the television types require magnetic deflection. In either case seismic signal display may be accomplished at generally lower power requirements. However, the use of a large screen cathode ray display becomes particularly practical under the provisions of the present invention where magnetic deflection coils are used and need be driven only with approximate saw-tooth waveforms of low power.

The present invention is an improvement over that of the aforesaid joint application Serial No. 388,582. In accordance with that application, a magnetic tape is formed into a continuous loop. It has recorded thereon the transient signal or signals. The continuous loop permits cyclic reproduction of the transient signal or signals and with the aforesaid apparatus permits a continuous visual display of the transient.

More particularly that application discloses a system for studying a primary seismic record of transient waves having associated therewith a periodic time base signal and an initial marker in predetermined time relation to the instant of generation of the transient. The system includes a means for cyclically scanning the phonographically reproducible record repeated to produce on a time scale or base a first signal corresponding to the transient wave, a second signal corresponding to the periodic time base signal and a third signal coincident and corresponding with the initial time marker. A visual monitoring unit, having a signal channel and a control channel, is connected to the scanning means for application of the transient to the monitoring unit signal channel. A normally non-conductive unit or gate connected to the scanning means is responsive to the second signal. A circuit responsive to the third or initial marker signal is connected between the scanning means and the non-conductive circuit to render it conductive during each cycle of the transient or first signal at a time coincident with the initial time marker. A counter or pulse-selecting circuit is connected between the normally non-conductive unit and the control channel of the monitoring means to apply to the control channel a selected cycle of the second signal to actuate the monitoring means and render it responsive to the first signal. Another means operable in the interval following the selected cycle of the second signal and the beginning of the next succeeding cycle of the first signal renders non-conductive the unit responsive to the second signal. By this system, selected portions of the seismic trace are fed into the visual monitoring unit at a persistence-of-vision rate and the trace modified to provide a maximum of intelligence before it is permanently re-recorded.

In accordance with the present invention, there is provided a system of the type above described in which a cathode ray tube has a raster formed by the sweeping of a fluorescent screen by a single electronic beam maintained at a very low intensity, or even blocked. Intensity modulation of the beam is provided by means responsive to the seismic or transient signals to intensify the beam for the visual production of patterns in the raster corresponding in shape with the waveform of the transient or modifications thereof.

More particularly, there is provided in accordance with the present invention a system for displaying a phonographically reproducible record of transient waves comprising a cathode ray tube having associated therewith means including control circuits for applying to the tube beam-deflecting signals. The beam, preferably at low intensity, is swept across the face of the cathode ray tube by the signals to form a high-frequency raster. An initiating or time-function voltage is generated and applied to a beam-intensity control circuit together with a voltage of amplitude dependent upon the instantaneous amplitude of the transient waves. A means operable under the control of the control circuit and instantaneously responsive to a signal therefrom increases the intensity of the beam to make it visible on the tube in positions representative of the instantaneous amplitude of the waves.

In a preferred arrangement employing the present invention, the transient data is visually presented by a cathode ray tube having means for producing a normally blanked or very low intensity vertical raster on the face of the tube, the line repetition of which is high compared to frequency components of the transient. The beam of the tube is intensified during each vertical excursion thereof in response to the transient signal to provide on the face of the tube visual traces or a display representative of amplitudes of the transient waves.

For further objects and advantages of the present invention, reference may be made to the following description taken in conjunction with the accompanying drawings in which.

Figure 1:
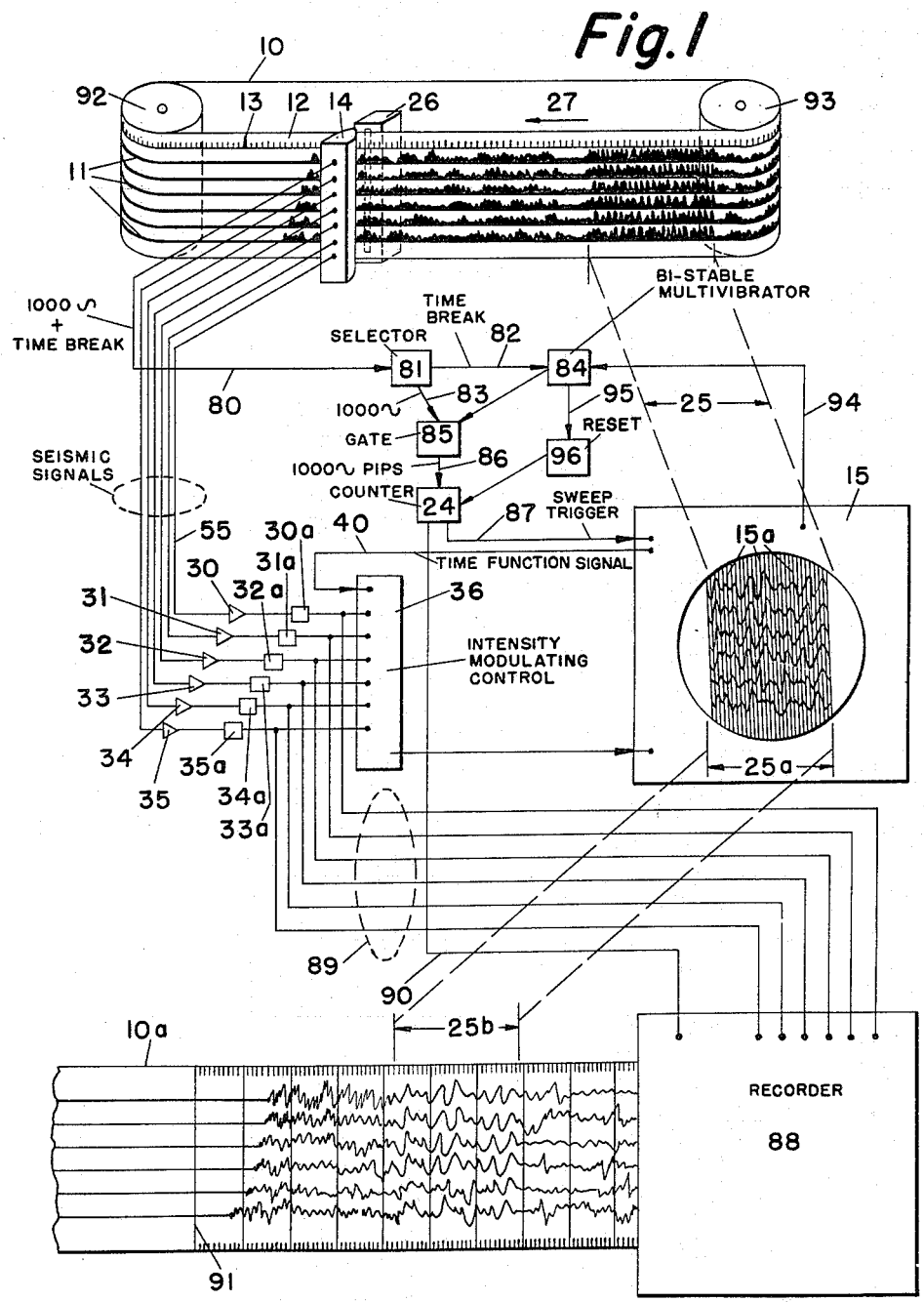
Fig. 1 illustrates the seismic display system, portions of which are in block diagram form.

Referring now to Fig. 1, a "six-trace seismogram" is shown in the form of a variable area recording on a transparency such as a photographic record film 10. The six-transient or signal traces 11 vary in amplitude in accordance with seismic signals received at a corresponding number of receiving stations spaced along a line on the surface of the earth in accordance with conventional seismic practices.

Though magnetic tape recording may be preferred, a variable area recording has been adapted for the purpose of this description since the functions to be considered may be graphically portrayed more readily than other forms of recording. It will be apparent that other types of phonographically reproducible records may be utilized in practicing the invention. For example, the variations in amplitude on the film 10 may be taken to represent intensity of magnetization of a magnetic tape or the modulation of a carrier for recording on a magnetic tape.

Since the general procedure for obtaining seismic records is well known and understood by those skilled in the art, it will not be described here in detail. Briefly, however, at a sending station spaced from the receiving stations, an explosive charge is detonated to produce seismic waves, an electrical impulse being generated coincident with the detonation of the explosive charge. The latter impulse is recorded as the time-break pulse or the initial marker 13 along with the timing signal 12 on the seventh record trace (the top trace, Fig. 1). The time-break pulse 13 and the periodic timing signal 12 are utilized accurately to measure the time required for energy to travel from the aforementioned sending station to a subsurface reflecting bed and back to the receiving stations. While a relatively high-frequency periodic timing signal, i.e., a carefully controlled 1,000 cycle per second signal, ordinarily is used, a low-frequency pulse signal has been here adopted and shown in Fig. 1 for the purpose of illustration only, it being representative of the conventionally employed high-frequency signal.

The seismic data recorded on the six traces 11 is characterized by initially high energy levels corresponding with the arrival of refracted waves successively at each receiving station and thereafter followed by a relatively quiescent period. In the record interval 25, it will be noted that there is a prominent burst of energy, this energy appearing at an intermediate record time in such a manner as to be generally indicative of energy reflected from a subsurface bed. That all of the receiving stations are affected by a given burst of energy at approximately the same instant after detonation of the explosive is apparent from a mere inspection of the record. However, the reduction of such information to accurate data useful in calculating the depth of the causal reflecting interface is often an impossible task. This is particularly true when the seismic energy represented by variations in trace amplitude is singular in character from trace to trace. Seismologists in their interpretation of seismic records rely upon coincidence not only of the time-occurrence of record energy but also upon substantial coincidence in the character of the seismic energy at the several seismic detecting stations. The system illustrated in Fig. 1, as will hereinafter appear, is particularly useful in reducing to useful data the seismic information from a record that otherwise may not be utilized in determining the location and/or nature of subsurface beds.

Varying voltages are produced which correspond both in number and in form to the signal traces 11 on the record 10. For example, they may be produced by a light-sensitive device housed in the unit 14 onto which a beam of light from a source 26 is projected. Unit 14 may include a plurality of transducers such as photoelectric cells. The light beam passes through a slit in the housing of source 26 and through the record 10 as it travels at substantially constant velocity past unit 14 in the direction of the arrow 27.

The signals from unit 14 are applied through seismic signal channels and a beam-intensity time control unit 36 to the monitoring unit or cathode ray oscilloscope 15 where, in accordance with the present invention, the electron beam is intensity modulated to produce a trace representative of the transient or seismic wave.

The cathode ray oscilloscope 15 is provided with control or sweeping circuits which cause an electron beam to be deflected or swept vertically across the face of the tube 16 and other control or sweeping circuits which cause the electron beam to be swept or deflected horizontally across the face of the tube; the combined action resulting in what is commonly termed a "raster" on the face of the tube. The raster is here illustrated as a series of visually perceptible vertical lines 15a. However, it will be understood that the intensity of the electron beam preferably will be reduced to the point where the raster, although present, will not be visible. In a preferred arrangement, the electron beam is intensity modulated in response to seismic signals as it is deflected vertically across the face of the tube to produce on the tube a dot signifying one point of a trace comprising part of the seismic signal to be visually reproduced. As the electron beam is swept horizontally across the face of the tube, there are visually produced other points which together will be representative of the recorded seismic wave or modifications thereof.

The positions along the deflection path of the electron beam at which the intensity of the beam is increased to produce the dot is controlled by the unit 36 which contains circuits responsive to signals including the instantaneous amplitude of the recorded seismic wave. The unit 36 is triggered by a signal from the oscilloscope 15 by way of channel 40 to produce pulses to be applied to the intensity control grid of the cathode ray oscilloscope during the vertical excursion of the beam and at time periods determined at least in part by the instantaneous amplitude of the transient signals or seismic waves.

Figures 2, 2A:
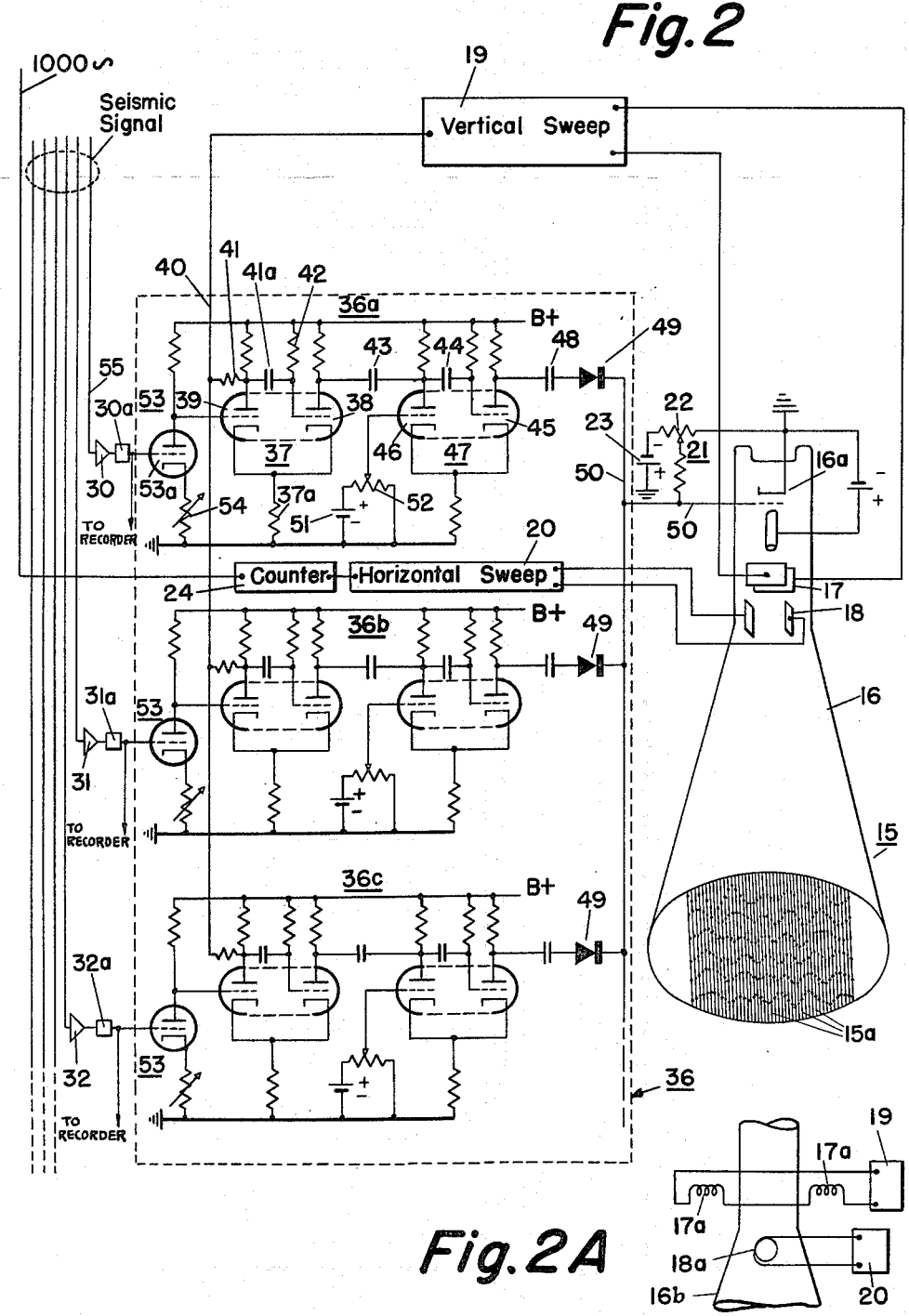
Fig. 2 is a more detailed schematic diagram of a portion of the system of Fig. 1 and illustrating a preferred embodiment of the present invention.
Fig. 2A is a modification of Fig. 2, illustrating another form of cathode ray tube.

Referring now to Fig. 2, there is schematically illustrated specific circuitry suitable for the practice of the present invention and including the cathode ray oscilloscope 15 which includes the cathode ray tube 16. The cathode ray tube 16 includes vertical deflection means 17 and horizontal deflection means 18, each associated with their respective sweep or deflection circuits 19 and 20.

The deflection means 17 and 18 are here illustrated to be of the electrostatic type. Where it is desired to obtain a large screen cathode ray display, it is usually necessary to employ cathode ray tubes having magnetic type deflection. Such an arrangement is illustrated in Fig. 2A wherein a cathode ray tube 16b has associated therewith coils 17a and 18a respectively connected to the vertical sweep 19 and the horizontal sweep 20 to provide vertical and horizontal deflection of an electron beam.

The sweep circuits may be of the standard type well known in the art, including saw-tooth oscillators. Under control of the sweep circuits 19 and 20, an electron beam, emitted from cathode 16a of the tube 16, is deflected in a vertical direction along one coordinate and horizontally swept along another coordinate across the face of the cathode ray tube 16 to produce a "raster" frame. The intensity of the beam impinging upon the fluorescent surface of the tube 16 is set at a very low value and preferably blanked by adjustment of a bias supply 21 comprised of a potentiometer 22 and a battery 23.

The vertical deflection or sweeping of the electron beam is continuous, preferably at a rate high compared to the frequency components of the transient wave to be visually reproduced; for example, a rate of 15 kilocycles has been found satisfactory. The horizontal sweeping of the electron beam, as will appear in greater detail hereinafter, is initiated by the initial marker 13 and the subsequent timing signals 12 by way of a pulse counter 24.

Each time the vertical-sweep circuit flies back to initiate another vertical excursion of the electron beam, there is produced a negative pulse which is simultaneously fed to the various intensity time-control circuits 36a, 36b and 36c comprising the control unit 36 which determine the time at which an increase in the intensity of the electron beam is to take place to visually form on the fluorescent face of the tube 16 a dot or dots representing a point or points of the transient or seismic wave traces. A separate control circuit 36a—36c is provided for each source of seismic signal, only three circuits being shown for the purpose of illustration.

In general the time-control circuit suitable for the practice of the present invention embodies a means which will be responsive to signals including the instantaneous amplitude of a transient wave or seismic signal to convert the amplitude into a corresponding time interval and to produce at the end of that time interval a pulse which will intensity modulate the deflecting electron beam of a cathode ray tube.

All the control circuits 36a—36c are identical and operate in like manner. From the specific description of one, the operation of the others will be understood. The control circuit 36a includes a multivibrator 37 which is shown to be of the cathode-coupled monostable type comprised of two electronic valves 38 and 39, here shown to be of the triode type. The triodes are preferably contained in a single envelope, but may be separate electronic valves or tubes. Under stable conditions, the triode or tube 38 is conducting. The tube 39 is held at cut-off by a biasing voltage derived from the potential across the cathode resistor 37a produced by the flow of current through the tube 38. Upon the occurrence of fly-back of the vertical sweep circuit 19, signifying the beginning of a new vertical excursion of the electron beam, there is fed to a first input, the grid of the tube 38, by way of conductor 40, resistor 41 and capacitor 41a a short negative pulse which drives the grid of the tube 38 sharply negative. There results a decrease in plate current through the tube 38, further resulting in a drop in the cathode potentials of the tubes 38 and 39 to within a few volts of the grid of tube 39, whereupon the tube 39 begins to conduct.

Upon the initiation of conduction of tube 39, there is produced in the plate circuit thereof a negative signal which is applied by way of capacitor 41a forming part of a positive feedback circuit to the grid of the tube or valve 38, thereby rapidly cutting it off. The continued conduction of tube 39 produces a negative rectangular-shaped pulse which after differentiation in the RC network, comprised of capacitor 41a and resistor 42, becomes an exponential timing waveform applied to the grid of tube 38. After a definite time interval, determined in the illustrated embodiment primarily by the timing wave, the grid of the tube 38 becomes more positive; and as it nears its cathode potential, the multivibrator 37 quickly reverts to the stable state.

Upon the reversion of the multivibrator 37 to the stable condition, there is produced at the plate of the tube 38 a negative-going pulse which is applied by way of capacitors 43 and 44 to the grid of electronic valve 45 which with electronic valve 46 comprises a second multivibrator 47 also of the cathode-coupled monostable type. Under stable conditions of the multivibrator 47, the valve or tube 45 is conducting. The application of the sharp negative pulse to the grid of tube 45 drives it to cut-off, and there is produced at the plate of the tube a sharp positive pulse which is applied by way of coupling capacitor 48, rectifier 49 and conductor 50 to the control grid of the cathode ray tube 16. The application of a sharp positive pulse to the control grid of the tube 16 causes an immediate intensification of the electron beam to produce on the face of the tube a visible dot.

The length or duration of the pulse produced by the multivibrator 47, and hence the vertical length of the visible dot, may be controlled by varying the bias applied to the grid of the tube 46 derived from a source including the battery 51 and the potentiometer 52. The duration preferably is of the order of about .5 microsecond. Of course, the return of the multivibrator 47 to a stable condition will cut off the positive pulse and likewise sharply reduce the intensity of the electron beam.

Each time the vertical sweep circuit flies back, there is again applied to the multivibrator 37 a signal which in the manner above described will produce a dot on the face of the cathode ray tube 16. By sweeping the beam horizontally, and thus effectively spacing the vertical excursions of the electron beam to cause it to move along spaced parallel paths, there will be produced across the face of the cathode ray tube an effectively continuous horizontal line.

In order to produce a plurality of spaced horizontal lines, and thus provide for the ultimate simultaneous visual production of a plurality of transient or seismic traces, each of the control circuits 36a, 36b and 36c, etc. is provided with a trace-position control circuit 53. Each of the circuits 53 is adjusted to a different value such that the pulses applied to the control grid of the tube 16 from the control circuits 36a, 36b and 36c will be spaced in time. Such timing of each control circuit is provided by the circuit 53 which may include the triode 53a having a variable resistor 54 in its cathode circuit and having its plate-cathode circuit in shunt with the grid-cathode circuit 39. This trace-position control circuit is effectively a grid bias arrangement, one of many suitable for use in conjunction with the present invention; for example, a simple potentiometer circuit may be used to obtain similar results.

A variation in bias signal produced by the trace-position control circuit and, as hereinafter described, the instantaneous magnitude of the seismic or transient wave will cause a change in the extent or magnitude of the rectangular pulse generated by the tube 39 during the unstable period of the multivibrator 37. Such change in the time period of instability will determine when, during vertical deflection, the electron beam is intensity-modulated. Considering for the moment solely the effect of the trace-position control circuit, it will be seen that the magnitude of a signal applied to a second input of the multivibrator 37, the grid of tube 39, may be adjusted by change in the value of the cathode resistor 54. A change of the cathode resistor 54 will cause an adjustment of the voltage applied to the grid of tube 39 and thus in turn will predetermine the magnitude of the drop in the cathode potential of tube 39 during the unstable period of the multivibrator 37.

The smaller the magnitude of the cathode potential drop, the longer it will take the multivibrator 37 to regain its stable condition, i.e., conduction of tube 38. Hence, by setting the various cathode resistors corresponding with resistor 54, each of the multivibrators 37 in control circuits 36a, 36b and 36c will have a different time period of operation or instability, and there will be produced on the face of the cathode ray tube a plurality of spaced horizontal lines.

Now upon the application of transient or seismic signals from the unit 14 (Fig. 1) to the grid of tube 53a, as by way of conductor 55, amplifier 30 and filter 30a, there results a change in the bias voltage applied to the tube 39. It will be remembered from the above discussion that the negative pulse generated by the vertical sweep circuit 19 causes a decrease in plate current in tube 38 which results in a drop across resistor 37a which determines the potential of the cathodes of tubes 38 and 39. The magnitude of the drop in potential of the cathodes of tubes 38 and 39 determines the length of time the multivibrator 37 will remain in an unstable state. The cathode potential drop is large when the bias applied to tube 39 from tube 53a is relatively low. In contrast, the drop is small when the bias applied to tube 39 from tube 53a is high. The bias applied to tube 39 from tube 53a depends upon the adjustment of the variable resistor 54 which determines the average level of the bias and in addition depends upon the seismic signal applied to the grid of tube 53a which modulates the normal anode potential of tube 53a in direct proportion to the instantaneous values of the seismic signal. Thus changes in the bias on the grid of tube 39 are effected by changes in the instantaneous amplitude of a seismic signal and thus the seismic signal controls the period of instability of multivibrator 37.

It can now be seen that each time the time-function or negative pulse is produced by the vertical sweep circuit 19, there will be produced in the output of the circuit 36a an electron beam-modulating pulse at a time interval which will depend upon the instantaneous magnitude of the seismic signal. A series of such vertical deflections swept across the face of the tube 16 by way of the horizontal sweep circuit will produce on the face of the tube a plurality of dots comprising a trace representative of the seismic or transient wave. By ascribing a different initial time period of operation to each of the control circuits 36a, 36b, 36c, etc., as by different adjustments for each of the cathode resistors such as resistor 54, it will be possible to simultaneously produce upon the face of the tube 16 a plurality of traces, each representative of a different seismic or transient wave. Where a plurality of control circuits are employed, it will be necessary to include in the output circuits thereof blocking means such as the rectifiers 49 so to prevent the output of any one of the circuits from being applied to the other circuits and thus disrupting their operation.

Now that one complete embodiment of the present invention has been described, it will be understood that other forms of circuitry may be substituted for the specific control circuit illustrated and described herein.

As illustrative of the variations which can be made without departing from the claims appended hereto, reference will now be made to another circuit which per se forms no part of the present invention but which is described and claimed in copending application Serial No. 537,157, filed September 28, 1955, entitled System for Visual Display of Transients, of G. M. Groenendyke.

Figure 3:
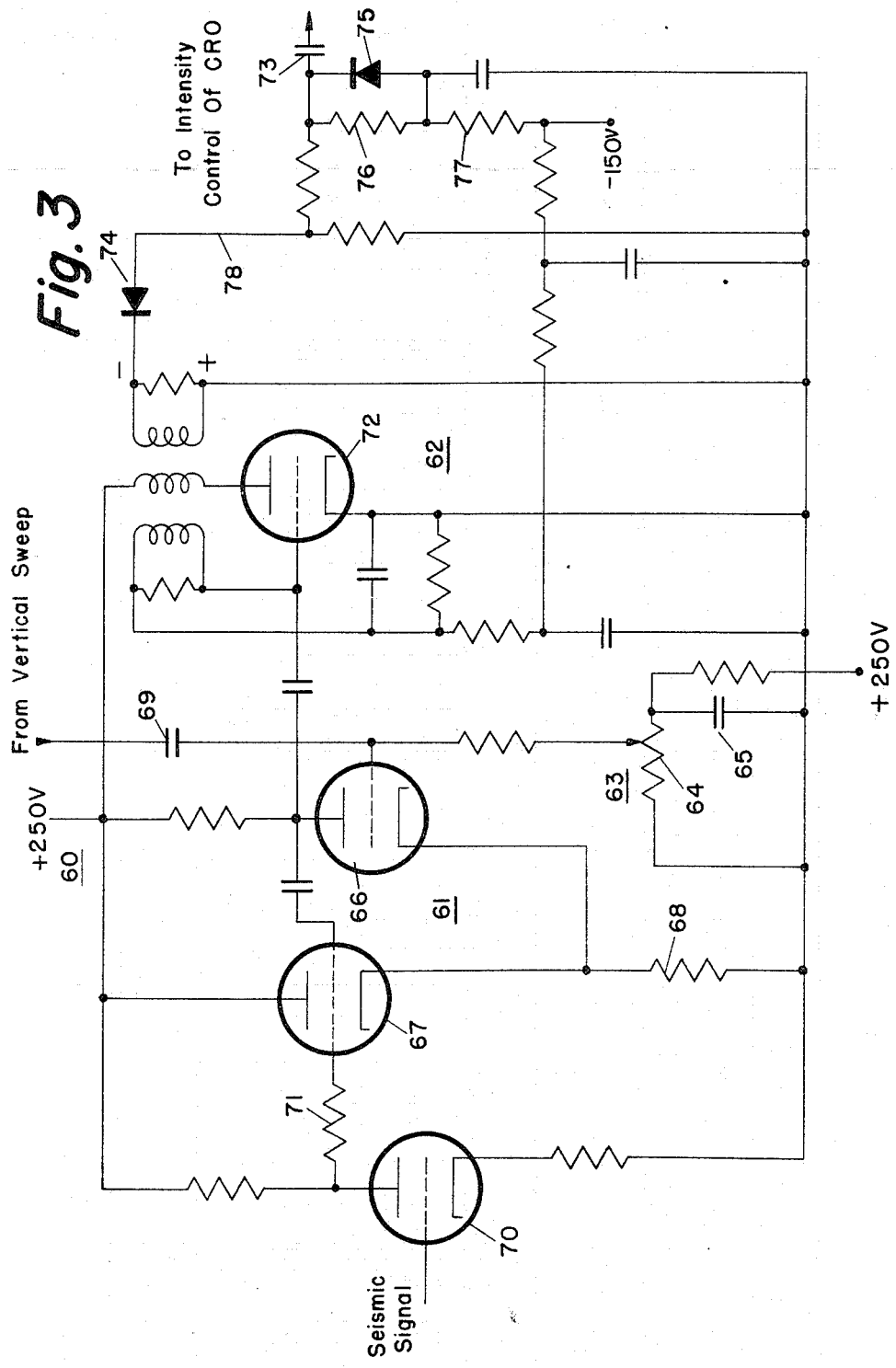
Fig. 3 schematically illustrates another modification which is applicable in the practice of the present invention.

Like the control circuit above described, the control circuit of Fig. 3 produces a beam-intensity modulating pulse at a time interval subsequent to the initiation of a time-function pulse derived from a vertical sweep circuit. The control circuit 60 includes a voltage comparator 61 which is here illustrated to be of the multivibrator type. The voltage comparator 61 produces a time-delayed pulse which in turn triggers a blocking oscillator 62 to produce a single beam-intensity modulating pulse for application to the cathode of a cathode ray tube.

The voltage comparator 61 includes cathode-coupled electronic valves or tubes 66 and 67. Under stable conditions the valve 66 is conducting, and the tube 67 is held at cut-off by a bias produced across the cathode resistor 68 by the plate-to-cathode current of the tube 66.

The control circuit 60 includes a trace-position control 63, comprising potentiometer 64, condenser 65, a source of supply, here selected as +250 v. and resistor 64a. The trace-position control 63 is adjustable to predetermine the initial position at which the electron beam will be intensified to produce a dot on the screen of the cathode ray tube. Upon initiation of a time-function signal from the vertical sweep circuit, there is applied to the grid of tube 66, by way of capacitor 69, a negative pulse which operates against the potential of the trace-position control circuit 63 to drive the multivibrator 61 into an unstable condition. The time, after the initiation of the time function at which the multivibrator 61 becomes unstable, will be determined by the slope of the time function and the magnitude of the grid bias applied to tube 66 by the trace-position control 63. In addition, the time at which the multivibrator 61 becomes unstable will also be determined by the instantaneous magnitude of the seismic signal applied to the grid of tube 67 by way of the electronic valve or tube 70 and resistor 71.

As is well known in the operation of multivibrators, the tube 67 will conduct when its cathode voltage is decreased to a value within a few volts of its grid voltage. Hence, the period of instability of the multivibrator 61 will be in part determined by the magnitude of the seismic signal which determines the grid bias applied to the tube 67.

When the multivibrator 61 becomes unstable, i.e., tube 67 begins conducting and tube 66 is cut off, there is produced in the plate circuit of tube 66 a sharp positive-going pulse which is applied to the grid of the tube 72 forming part of the blocking oscillator 62.

The application of the positive pulse to the blocking oscillator 62 causes it to cycle and produce a negative-going pulse which is applied by way of the capacitor 73 to the cathode of the cathode ray tube. The electron beam of the cathode ray tube is thus intensity modulated to produce upon the face of the tube a dot forming part of the trace representative of the seismic or transient wave.

Where a plurality of control circuits are employed in the manner as illustrated in Fig. 2, the control circuits 60 of Fig. 3 may have their tubes connected to a common point, here illustrated as the conductor 78. In order to prevent interaction between the control circuits, a diode 74 may be added in the output of each blocking oscillator so as to prevent a signal from one blocking oscillator from interfering with the normal operation of the other blocking oscillator.

It is further desirable to uniformly control the intensity of the dots produced by the cathode ray tube. For this purpose there is added a limiter circuit, comprised of the diode 75 and resistors 76 and 77, which limits the control pulse applied to the cathode of the cathode ray tube to any desired magnitude, for example, 50 volts. During the quiescent periods, i.e. the periods between control pulses produced by the blocking oscillator 62, the diode 75 is in a non-conductive state inasmuch as its plate is more negative than its cathode due to the application of a negative bias, here selected as −150 volts. By way of the voltage divider, comprised of the resistors 76 and 77 there is applied to the cathode of the cathode ray tube through capacitor 73 a potential that is more positive than the potential applied to the plate of the diode 75. The voltage applied may be assumed for purposes of discussion to be approximately —100 volts. The application of —100 volts to the cathode of the tube is adequate to blank the electron beam.

Upon the production of a negative pulse from the blocking oscillator 62, the potential at the cathode of the diode 75 will become more and more negative until the diode conducts, at which time there will be applied to the cathode of the cathode ray tube the potential at the plate of the diode. Making the cathode of the cathode ray tube more negative has the effect of making the grid more positive and thus increasing the intensity of the electron beam to visibility. Thereafter, despite greater changes in the magnitude in the pulse produced by the blocking oscillator 62, the voltage applied to the cathode of the cathode ray tube will be limited to the potential at the plate of the diode 75. In this manner control pulses of uniform magnitude will be applied to the intensity control or cathode of the cathode ray tube, and the dots produced at the screen of the tube will be of equal intensity.

In the study of seismic or transient waves, it may be desirable to select a specific portion of the wave for analysis, for example, portion 25, illustrated in Fig. 1. Hence, it is necessary that the specific portion to be analyzed be repeatedly transmitted for reproduction by the cathode ray tube 16 at a persistence-of-vision rate. A system is illustrated in block schematic form (Fig. 1) for preselecting any given portion of a seismic wave to be reproduced and for repeating the presentation of the selected seismic signals at a persistence-of-vision rate. Such a system is specifically disclosed in the aforementioned copending application of George B. Loper and Robert Pittman and also in the May 1955 edition of "Electronics" at pages 160–165. A brief description of this system will now be undertaken for a better understanding of the present invention.

It will be remembered that upon the outset of producing the reproducible record 10, there was generated in coincidence with the detonation of the explosive charge and recorded an electrical pulse which appears as the sharp opaque marker 13 superimposed upon the constant frequency and time base signal 12. The output of the transducer in detector 14 responsive to the top record trace comprises two components. The first component is a constant frequency periodic signal which regardless of the speed at which the record 10 is driven, provides a scaled time-base voltage for measurement of the time-occurrence on the record 10 of any selected seismic event. The second component is a sharp pulse or initial marker of distinctive character. It is generated once for each complete cycle of the record 10 at a scaled record time corresponding with the instant of detonation of the explosive charge. The scaled time-base signal is produced by variations in light passing through the constant frequency portion 12 of record 10, whereas the initial marker is generated by variations in light due to the opaque marker 13 adjacent the detector 14.

Combined voltages including the distinctive initial marker and the time-base voltage are applied to channel 80 leading from detector 14 and are applied to a selector or separator 81 which has a single input channel, channel 80, and two output channels, channels 82 and 83. The first output channel 81 selectively transmits the initial marker corresponding with the recorded pulse 13 to the circuit 84, a switching unit. Similarly, the channel 83 selectively transmits the periodic time-base voltage corresponding to the periodic wave 12 to the gating unit 85.

As above mentioned, the periodic time—base signal 12 may be of any selected carefully controlled frequency. To expedite calculations in the decimal system, a frequency that is a multiple of 10 is preferred. For the purpose of the present discussion, it will be assumed that the periodic wave 12 has a frequency of 1,000 cycles per second so that the channel 83 transmits a scaled 1,000 cycle per second signal to the gating unit 85.

The switching unit 84 may be a bi-stable multivibrator, for example, which operates selectively to render the gating unit 85 conductive or non-conductive in response to the initial marker pulse 13, thereby to control the intervals during which the periodic time-base signal may be transmitted to the gating unit output channel 86.

When the gating unit 85 is conductive, it serves not only to transmit periodic timing pulses to the channel 86 but also to shape them for application to and actuation of the counting circuit 24. The periodic time-base signal is applied to the counter 24 by channel 86 and is in the form of 1,000 unidirectional "pips" or pulses per scaled second interval, whereas the voltage on the output channel 87 is a single pulse for actuation of the horizontal sweep circuit 20 (Fig. 2) of the oscilloscope 15.

Counter 24 is essentially a selective time-delay network which selects from the periodic time-base signal any selected pulse following the instant that the gating unit 85 is rendered conductive. It operates as a count-down circuit operative to produce pulse division by a selectable whole number ratio. The application of a single selected pulse to the horizontal sweep circuit 20 in each cycle of reproduction of the sesimic record 10 triggers it to initiate, for each cycle of the record 10, the presentation of a visual display on the screen of the oscilloscope 15. The seismic events will thereby appear at precisely the same location on the oscilloscope screen for each cycle of record 10. Thus, the record 10 may be repeatedly driven past the detector 14 and the selected portion of the record, such as the portion 25, may be repeatedly displayed on the oscilloscope screen as portion 25a in such detail that filtering means 30a—35a associated with amplifiers 30—35 may be adjusted for optimum resolution of the seismic data. When such resolution has been accomplished, the permanent record 10a may be made of the seismic signal, thus modified, upon energization of the recorder 88 which may be of the conventional type and which records the plurality of traces as undulating lines. More particularly, the modified seismic signals as they appear at the outputs of the amplifying channels are applied by way of the plurality of circuits 89 to the input terminals of the recorder 88. A suitable recorder is described and shown in the aforementioned "Electronics" article.

A time scale channel 90 interconnects the counter 24 and the recorder 88 to provide a time-controlled scale on the secondary record 10a. A first timing line 91 on record 19a appears in a space relation relative to the record segment 25b, in the same relation as the initial marker 13 bears to the interval 25 of record 10. The space relation between line 13 and segment 25 may be the same as between timing line 91 and record segment 25b or they may be different, depending upon the scaling factor utilized in the reproduction and re-recording of the signals on record 10.

As above noted, the record 10 in the form of a continuous loop, carried by rollers 92 and 93, is driven at a constant speed by means such as a suitable motor (not shown). The record follows a path closely adjacent the detector unit 14 repeatedly to reproduce the seismic signals in the form of varying voltages. Following each cycle of signal generation from detector 14, the gate 85 and counter 24 are reset preparatory to receiving the next succeeding cycle.

A voltage directly related in time to the signal presentation on the oscilloscope 15, such as the end-of-sweep flyback voltage applied to the horizontal oscilloscope plates, for example, is applied by way of channel 94 to the bi-stable multivibrator 84 to actuate the latter and render gate 85 non-conductive. Additionally, a pulse is applied by way of channel 95 and the reset generating circuit 96 to the counter 24. The reset generating circuit 96 operates to place the counter 24 in a zero or initial condition for reception of a succeeding cycle of timing signals from the detector 14.

While the above selecting circuits are operable to periodically energize the horizontal sweep circuit of the oscillator, the signals from the detector 14 are continuously fed into the intensity-modulating control unit 36 and from that control unit to the intensity control of the cathode ray tube 16. Thus, upon each application of a control pulse to the horizontal sweep circuit, there appears across the face of the cathode ray tube 16, in accordance with the invention, a plurality of traces representative of the recorded seismic waves.

While the invention has been illustrated and described in connection with certain specific modifications thereof, it will be understood that further modifications may now suggest themselves to those skilled in the art, and it is to cover such modifications as are within the scope of the appended claims.

What is claimed is:

1. A system for displaying a reproducible record of transient waves recorded as traces in conjunction with a timing signal having a distinctive character at the instant of generation of said transient waves comprising, a cathode ray tube, means including a control circuit for applying to said tube beam-deflecting signals, means operable under the control of said timing signal of distinctive character for applying to said tube beam-sweeping signals, electron beam intensity-modulating control circuits each including a monostable multivibrator, each multivibrator having states of instability whose period is different for each multivibrator, means for applying to said multivibrators an initiating signal corresponding in time with the beginning of each beam deflection to drive said multivibrators into their unstable states, means for applying to said multivibrators voltages of amplitude representative of the instantaneous amplitudes of said transient waves for varying the periods of instability and the time at which control pulses are generated by said multivibrators, means operable in response to said control pulses generated as each multivibrator returns to its stable state for instantaneously increasing the intensity of said electron beam to make it visible on the face of said tube in positions forming traces representative of said amplitudes of said waves, and means for repetitively presenting said reproducible record for reproduction of said timing signal of distinctive character at a time rate which produces said beam-sweeping signals at a persistence-of-vision rate for said electron beam for reproduction on said tube of representations of said waves.

2. A system for displaying a reproducible record of a transient wave recorded as a trace in conjunction with a timing signal having a distinctive character at the instant of generation of said transient wave comprising, a cathode ray tube, means including a control circuit for applying to said tube beam-deflecting signals, means operable under the control of said timing signal of distinctive character for applying to said tube beam-sweeping signals, an electron beam intensity-modulating control circuit including a multivibrator having a control grid circuit, means for applying to said multivibrator an initiating signal for beginning generation of a control pulse by said intensity-modulating control circuit for intensity modulating said electron beam, a trace-position control means in said grid circuit of said multivibrator for adjusting the average time at which said intensity-modulating control circuit will initiate said control pulse, means for applying to said grid circuit of said multivibrator a voltage of amplitude representative of the instantaneous amplitude of said transient wave for varying the time at which said control pulse is generated, means operable in response to said control pulse for instantaneously increasing the intensity of said electron beam to make it visible on the face of said tube in positions forming a trace representative of said amplitudes of said wave, and means for repetitively presenting said reproducible record for reproduction of said timing signal of distinctive character at a time rate which produces said beam-sweeping signals at a persistence-of-vision rate for said electron beam for reproduction on said tube of representations of said wave.

3. A system for visually displaying seismic data originally recorded as separate traces on a photographically reproducible seismogram and comprising a cathode ray tube adapted to project a beam of electrons onto a screen of said tube, means for deflecting said beam vertically at a linear rate across said screen and at a rate high compared to frequency components of said seismic traces, means for producing initiating signals each of which is produced at a time corresponding with the beginning of each vertical deflection of said beam over said screen, a plurality of monostable multivibrators equal in number to the number of traces to be visually presented, each of said multivibrators generating a timing function during its period of instability and being responsive to said initiating signals to enter into its unstable state, each of said multivibrators comparing its associated seismic trace with said timing function to produce signal pulses whose times of occurrence vary in accordance with the amplitude of the associated seismic trace, and means common to all said time pulse modulating circuits for applying said signal pulses to said cathode ray tube to intensify said beam and produce a visual indication thereof at spaced points along the vertical path of said beam representative of the instantaneous values of said seismic traces.

4. In a cathode ray tube viewing device for exhibiting a plurality of signal voltages on a fluorescent target and including means for generating a beam of electrons and directing it at the target, means for controlling the intensity of the beam to turn it on and off, means for generating a timing function, first means for deflecting the beam in a first direction at a high frequency, second means for deflecting the beam at a low frequency in a second direction substantially perpendicular to said first direction, means for adding a different bias voltage to each of said signal voltages to produce a plurality of composite voltages, means for comparing the composite voltages individually with said timing function operable to produce pulses of voltage at different points along said first direction determined by the bias voltages and by the magnitudes of the signal voltages, said last-named means being connected to said intensity-controlling means to turn the beam on each time said last-named means provides a pulse of voltage.

5. In a cathode ray tube viewing device for exhibiting a plurality of signal voltages on a fluorescent target and including means for generating a beam of electrons and directing it at the target, means for controlling the intensity of the beam to turn it on and off, means for generating a timing function, first and second means for deflecting the beam along one dimension and another dimension substantially perpendicular to said one dimension of the target, respectively, means for applying a deflecting voltage of sawtooth waveform and of high frequency to said first deflecting means, means for generating a sawtooth wave of low frequency and applying it to said second deflecting means, means for adding a different bias voltage to each of said signal voltages to produce a plurality of composite voltages, means for comparing the composite voltages individually with the timing function operable to produce pulses of voltage at different points along said high frequency sawtooth waveform determined by the bias voltages and by the magnitudes of the signal voltages, said last-named means being connected to said intensity-controlling means to turn the beam on each time said last-named means provides a pulse of voltage.

6. The device of claim 5 in which said timing function is generated by said comparing means.

7. The device of claim 5 in which there are included pulse generators responsive to said pulses of voltage to generate pulses of short duration for application to said intensity-controlling means.

8. The device of claim 7 in which each of said pulse generators is a multivibrator.

9. The device of claim 8 in which each of said pulse generating multivibrators includes means for varying the time duration of the pulses generated thereby.

References Cited in the file of this patent

UNITED STATES PATENTS

| | | |
|---|---|---|
| 2,483,140 | Higham | Sept. 27, 1949 |
| 2,628,689 | Rieber | Feb. 17, 1953 |
| 2,658,579 | Rieber | Nov. 10, 1953 |

FOREIGN PATENTS

| | | |
|---|---|---|
| 156,861 | Australia | Jan. 17, 1952 |

UNITED STATES PATENT OFFICE
CERTIFICATE OF CORRECTION

Patent No. 2,912,672                                                 November 10, 1959

George B. Loper

It is hereby certified that error appears in the printed specification of the above numbered patent requiring correction and that the said Letters Patent should read as corrected below.

Column 2, line 8, for "diaplay" read -- display --; line 15, for "repeated" read -- repeatedly --; column 10, line 50, for "19a" read -- 10a --.

Signed and sealed this 3rd day of May 1960.

(SEAL)
Attest:

KARL H. AXLINE                                        ROBERT C. WATSON
Attesting Officer                                   Commissioner of Patents